US010619818B2

(12) United States Patent
Li et al.

(10) Patent No.: US 10,619,818 B2
(45) Date of Patent: Apr. 14, 2020

(54) ONE-PIECE SUPPORT FOR LIGHT DEVICE WITH A MATRIX OF MICROMIRRORS

(71) Applicant: VALEO VISION, Bobigny (FR)

(72) Inventors: Joel Li, Bobigny (FR); Sylvain Chanez, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/718,789

(22) Filed: Sep. 28, 2017

(65) Prior Publication Data

US 2018/0087739 A1 Mar. 29, 2018

(30) Foreign Application Priority Data

Sep. 28, 2016 (FR) ..................................... 16 59227

(51) Int. Cl.
*F21V 5/00* (2018.01)
*F21S 43/31* (2018.01)
(Continued)

(52) U.S. Cl.
CPC ................ *F21S 43/31* (2018.01); *B60Q 1/30* (2013.01); *F21S 41/39* (2018.01); *F21S 41/675* (2018.01); *F21S 43/14* (2018.01); *F21S 43/19* (2018.01); *F21S 43/26* (2018.01); *F21S 43/37* (2018.01); *F21S 45/47* (2018.01); *F21V 5/002* (2013.01); *F21V 29/74* (2015.01); *F21Y 2115/10* (2016.08)

(58) Field of Classification Search
CPC .. B60Q 2300/314; F21S 41/14; F21S 41/675; F21S 41/25; F21S 41/32; F21V 9/30; F21V 13/14; F21V 14/04; F21V 25/02; F21V 9/16
USPC ......................................................... 362/520
See application file for complete search history.

(56) References Cited

U.S. PATENT DOCUMENTS 5,796,094 A * 8/1998 Schofield ............... B60N 2/002
250/208.1
6,355,920 B1 * 3/2002 Schofield ............. B60Q 1/1423
250/205
(Continued)

FOREIGN PATENT DOCUMENTS

| | | |
|---|---|---|
| JP | 2014-106270 | 6/2014 |
| JP | 2016-91976 | 5/2016 |
| WO | WO 2016/050503 A1 | 4/2016 |

OTHER PUBLICATIONS

French Preliminary Search Report dated May 31, 2017 in French Application 16 59227 filed on Sep. 28, 2016 (with English Translation of Categories of Cited Documents).

*Primary Examiner* — Thien M Le
(74) *Attorney, Agent, or Firm* — Oblon, McClelland, Maier & Neustadt, L.L.P.

(57) ABSTRACT

The subject of the invention is a support for a light module, notably for a motor vehicle, including a reception zone for at least one light source. A reception zone for an optical device for forming the light is emitted by the light source or sources. A reception zone for an electromechanical microsystem with at least one mirror capable for receiving the rays originates from the optical forming device. A reception zone for at least one optical projection device receives the rays reflected by the mirror or mirrors of the electromechanical microsystem. The support forms a cavity with an aperture and comprises an outer surface around said aperture, said surface forming the reception zone for the electromechanical microsystem.

26 Claims, 3 Drawing Sheets

(51) Int. Cl.

| | |
|---|---|
| ***F21S 41/39*** | (2018.01) |
| ***F21S 41/675*** | (2018.01) |
| ***F21V 29/74*** | (2015.01) |
| ***F21S 43/37*** | (2018.01) |
| ***F21S 43/14*** | (2018.01) |
| ***F21S 43/19*** | (2018.01) |
| ***F21S 45/47*** | (2018.01) |
| ***F21S 43/20*** | (2018.01) |
| ***B60Q 1/30*** | (2006.01) |
| *F21Y 115/10* | (2016.01) |

(56) References Cited

U.S. PATENT DOCUMENTS 6,386,744 B1 * 5/2002 Scholl .................... F21V 11/12 362/518
6,992,573 B2 * 1/2006 Blank .................... B60R 1/088 340/438
7,994,462 B2 * 8/2011 Schofield ............ G05D 1/0244 250/208.1
9,214,783 B2 * 12/2015 Nomura ................... H01S 5/00
9,658,447 B2 * 5/2017 Bhakta .............. G02B 26/0833
9,689,549 B2 * 6/2017 Suwa ................. F21S 48/1757
9,758,087 B2 * 9/2017 Albou .................. F21S 41/675
2003/0031027 A1 * 2/2003 Weihing ................. F21S 41/43 362/539
2005/0237620 A1 10/2005 Hsu et al.
2006/0078266 A1 4/2006 Wu et al.
2008/0259290 A1 10/2008 Wang et al.
2015/0092435 A1 4/2015 Yamamura et al.
2015/0160454 A1 * 6/2015 Bhakta .............. G02B 26/0833 362/513
2015/0377446 A1 * 12/2015 Bhakta .............. G02B 26/0833 362/510

* cited by examiner

ONE-PIECE SUPPORT FOR LIGHT DEVICE WITH A MATRIX OF MICROMIRRORS

The invention deals with the field of lighting and light signaling, notably for a motor vehicle. More particularly, the invention deals with a light signaling device capable of producing light pictograms by means of an electromechanical microsystem with a matrix of micromirrors.

The published patent document US 2015/0175054 A1 discloses a light device for a motor vehicle headlight. The device comprises a light source of laser type, an electromechanical microsystem serving as deflector of the light from the laser, a luminophore element of phosphor type capable of converting the monochromatic light reflected by the deflector, and an optical device comprising several lenses receiving the white light originating from the luminophore element. The deflector can be driven so as to modulate the light image thus produced. The device comprises a support to support these different elements. The support consists of several parts assembled to one another, directly or indirectly such as, for example, via the housing of the device or of the headlight. Such an assembly does however have the consequence of forming tolerance chains reducing the relative positioning accuracy of the different elements. In some optical configurations, particularly when the light source is very close to the deflector, tight tolerances are required to achieve a satisfactory result. Furthermore, in this teaching, the deflector is disposed on the inner face of a wall of the support, whereas this type of component is usually fixed onto a board with printed circuit, such a board being potentially bulky, particularly when numerous electronic components are necessary to control the deflector.

The aim of the invention is to mitigate at least one of the drawbacks of the abovementioned prior art. More particularly, the aim of the invention is to propose a solution ensuring an accurate positioning of the optical components of a light device comprising an electromechanical microsystem provided with one or more mirrors.

The subject of the invention is a support for a light module, notably for a motor vehicle, comprising: a reception zone for at least one light source; a reception zone for an optical device for forming the light emitted by the light source or sources; a reception zone for an electromechanical microsystem with at least one mirror capable of receiving the rays originating from the optical forming device; and a reception zone for at least one optical projection device receiving the rays reflected by the mirror or mirrors of the electromechanical microsystem; noteworthy in that the support forms a cavity with an aperture and comprises an outer surface around said aperture, said surface forming the reception zone for the microsystem.

According to an advantageous embodiment of the invention, the support comprises a body made of a single piece, preferentially of aluminum, said body forming the reception zones for the light source or sources, for the optical forming device and for the optical projection device.

According to an advantageous embodiment of the invention, the support comprises a plate that can be fixed to the body in order to partially seal the cavity and comprising the outer surface forming the reception zone for the microsystem.

According to an advantageous embodiment of the invention, the cavity is covered with antireflection and/or absorbent coating, preferentially black.

According to an advantageous embodiment of the invention, the cavity is delimited by the reception zone for the optical forming device and the reception zone for the optical projection device.

According to an advantageous embodiment of the invention, at least one, preferentially each, of the reception zones for the optical devices comprises an orifice formed in the support and a shoulder around said orifice.

According to an advantageous embodiment of the invention, the device comprises, within the cavity, a tongue overhanging with an orifice intended to be passed through by the light reflected by the microsystem toward the optical projection device.

Another subject of the invention is a light device, notably for a motor vehicle, comprising: a support; at least one light source disposed on the support; an optical device for forming the light emitted by the light source or sources, said device being disposed on the support; an electromechanical microsystem with at least one mirror capable of receiving the rays originating from the optical forming device, said microsystem being disposed on the support; and an optical projection device capable of receiving the light reflected by the mirror or mirrors of the electromechanical microsystem, said device being disposed on the support; noteworthy in that the support conforms to the invention.

According to an advantageous embodiment of the invention, the light source or sources, the optical forming device and the microsystem form a first optical axis, and said microsystem and the optical projection device form a second optical axis, the angle between said optical axes lying between 40° and 65°, preferentially between 45° and 60°.

According to an advantageous embodiment of the invention, the light source or sources are of the light-emitting diode type on a board disposed on a heat sink fixed to the reception zone for said light source or sources. According to another advantageous embodiment of the invention, alternative to the previous embodiment, the light source or sources, of the light-emitting diode type, are disposed via a base directly on the heat sink fixed to the reception zone for said light source or sources.

According to an advantageous embodiment of the invention, the optical forming device comprises a biconvex lens and/or the projection device comprises a biconvex lens and a biconcave lens.

According to an advantageous embodiment of the invention, the or each of the lenses of the optical device or devices is held in place by a flange, fixed, for example, by screwing, gluing, welding, crimping, heading, by bushing or by means of pegs or rivets, or any other fixing means, or by the combination of two or more of these means.

According to an advantageous embodiment of the invention, the optical forming device has a diameter greater than two times, preferentially three times, that of the optical projection device.

According to an advantageous embodiment of the invention, the microsystem is on a printed circuit board, said board being fixed to the support so as to press said microsystem against the reception zone for said microsystem.

According to an advantageous embodiment of the invention, the light device is a rear signaling light capable of forming pictograms in the light beam produced, said pictograms being a function of a programming of the microsystem.

The provisions of the invention are advantageous in that they may be possible to ensure an exact positioning of the different components, including the electromechanical microsystem even though the latter is on a printed circuit board.

Other features and advantages of the present invention will be better understood from the description and the drawings in which.

Figure 1:
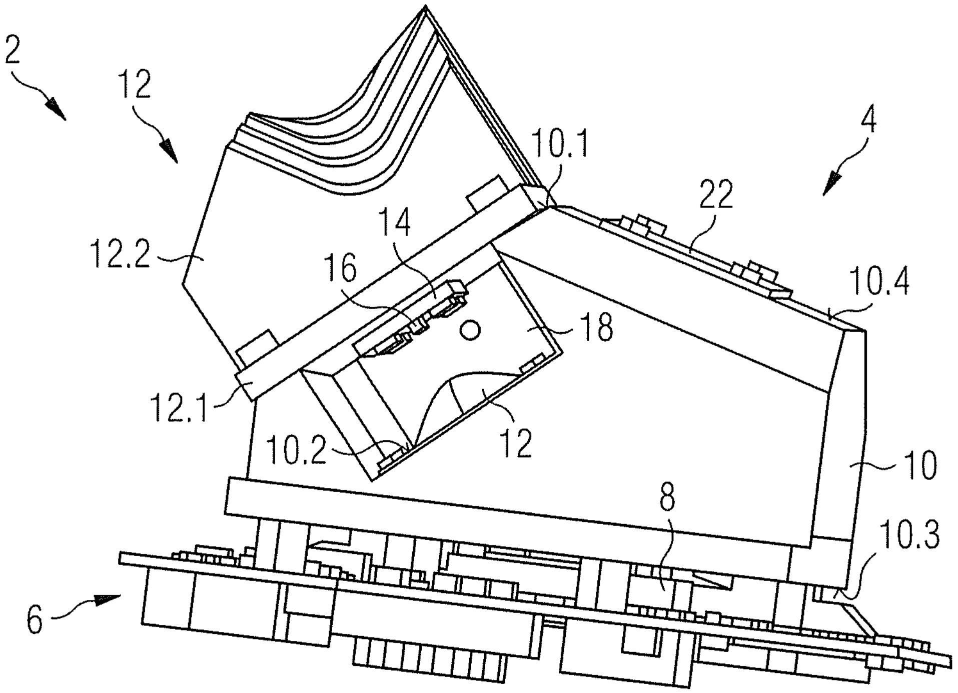
FIG. 1 is a perspective representation of a light device conforming to the invention.
Figure 3:
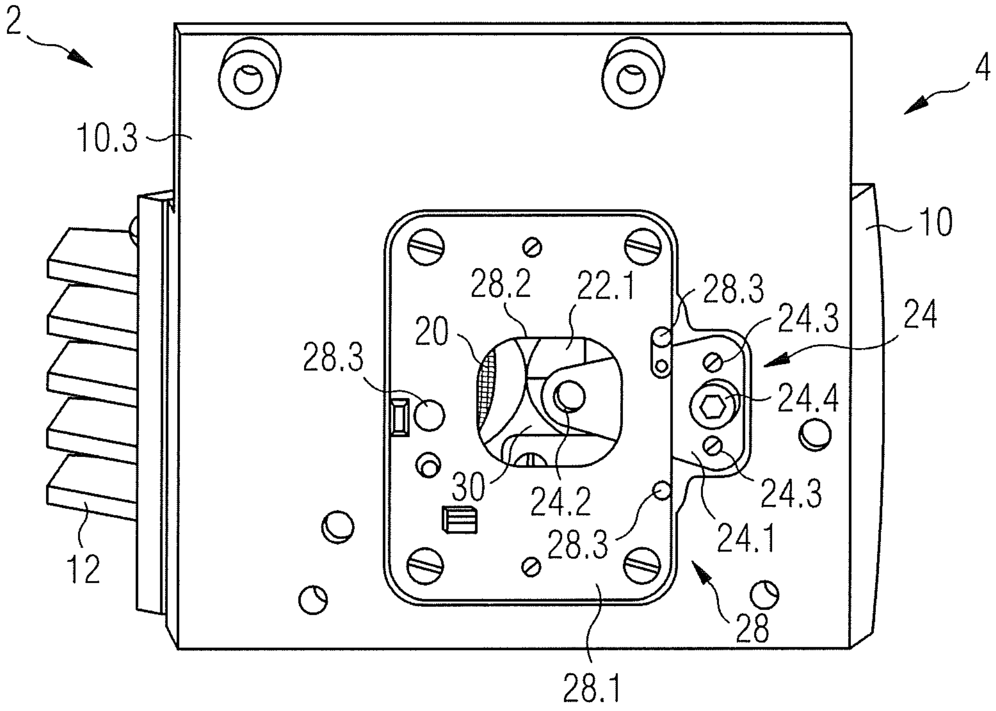
FIG. 3 is a view from below of the support of the light device of FIG. 1.
Figure 4:
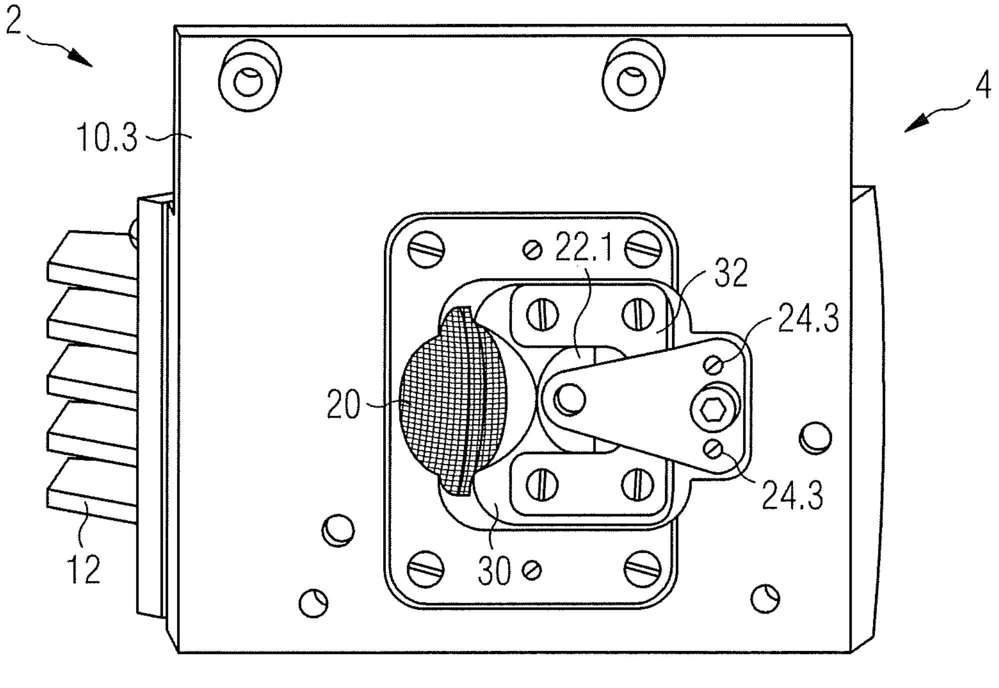
Figure 5:
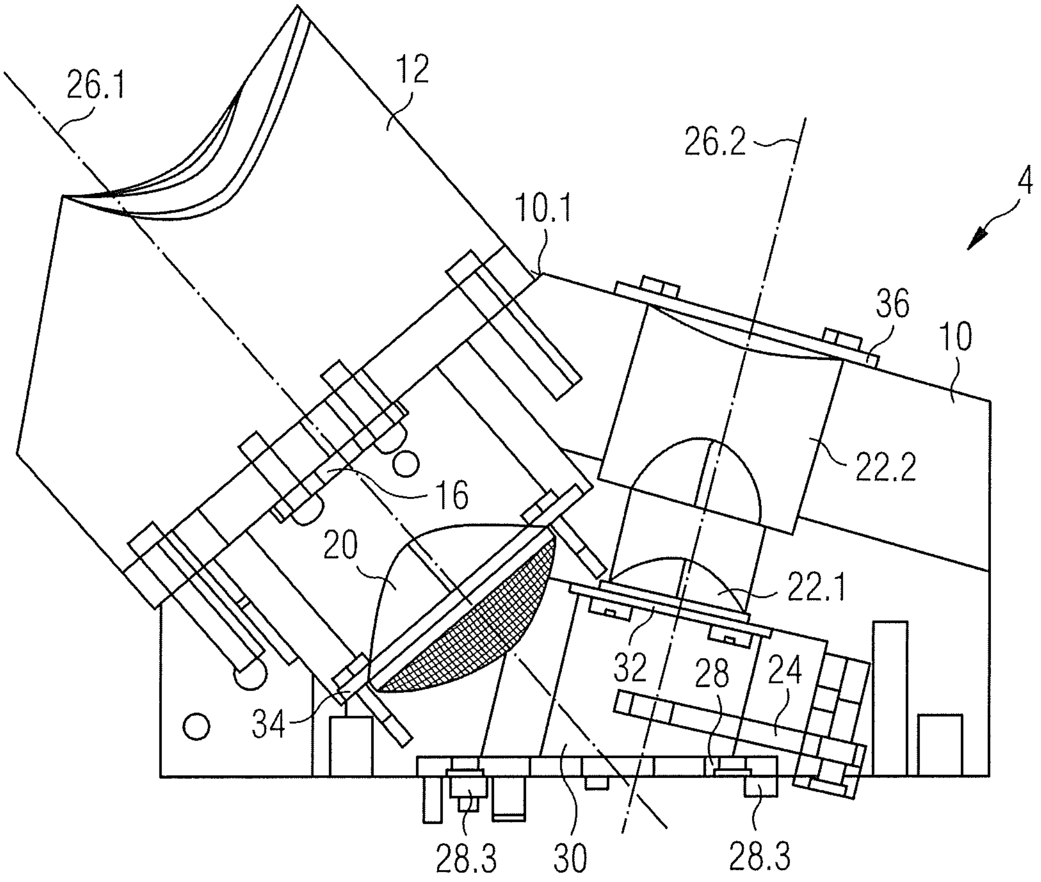

FIG. 4 corresponds to FIG. 3 in which the plate partially sealing the cavity of the support is absent;

FIG. 5 is a median longitudinal cross section of the light device of FIG. 1.

FIGS. 1 to 5 illustrate an embodiment of the invention, it being understood that other embodiments can be envisaged.

FIG. 1 is a perspective representation of the light device 2 conforming to the invention. The light device 2 is, in this particular case, a light signaling device for a motor vehicle. It comprises, essentially, a support 4, optical components disposed on the support 4 and a printed circuit board 6 with electronic components and an electromechanical optical microsystem 8. The latter comprises a matrix of micromirrors capable of being pivoting controlled individually. Such a microsystem, is commonly called a matrix of micromirrors or DMD (Digital Micromirror Device). Each mirror can take two positions: it can be inclined by 10 to 15° according to the same axis so as to reflect the light either towards a diffusion lens or toward an absorbent surface. It is said to switch "on" or "off", and this arrangement is therefore binary. Such a microsystem is itself well known to a person skilled in the art.

The support 4 of the light device 2 comprises a body 10 on which is mounted a heat sink 12. The latter comprises an extended portion 12.1 receiving a board 14 with one or more light sources 16, for example of the light-emitting diode type. The heat sink 12 also comprises fins 12.2 extending essentially parallel to one another from the extended portion 12.1. The body 10 comprises a reception zone 10.1 for the heat sink 12 supporting the light source 16. The body forms a void 18 facing the light source 16. The bottom of this void 18 forms a reception zone 10.2 for a forming lens 20. The latter forms an optical device forming the light emitted by the light source 16. The body 10 forms a cavity (not visible in FIG. 1) with an aperture on the bottom face 10.3 of said body. The electromechanical microsystem 8 is disposed facing this aperture in order to receive the light beam formed by the forming lens 20. The body 10 also comprises a reception zone 10.4 for an optical projection device 22. The latter can comprise two lenses, of which only one is visible in FIG. 1.

The body 10 is advantageously made of a single piece, for example of aluminum. The same applies for the heat sink 12. Each of these two elements can be produced by machining or casting followed possibly by machining operations.

Figure 2:
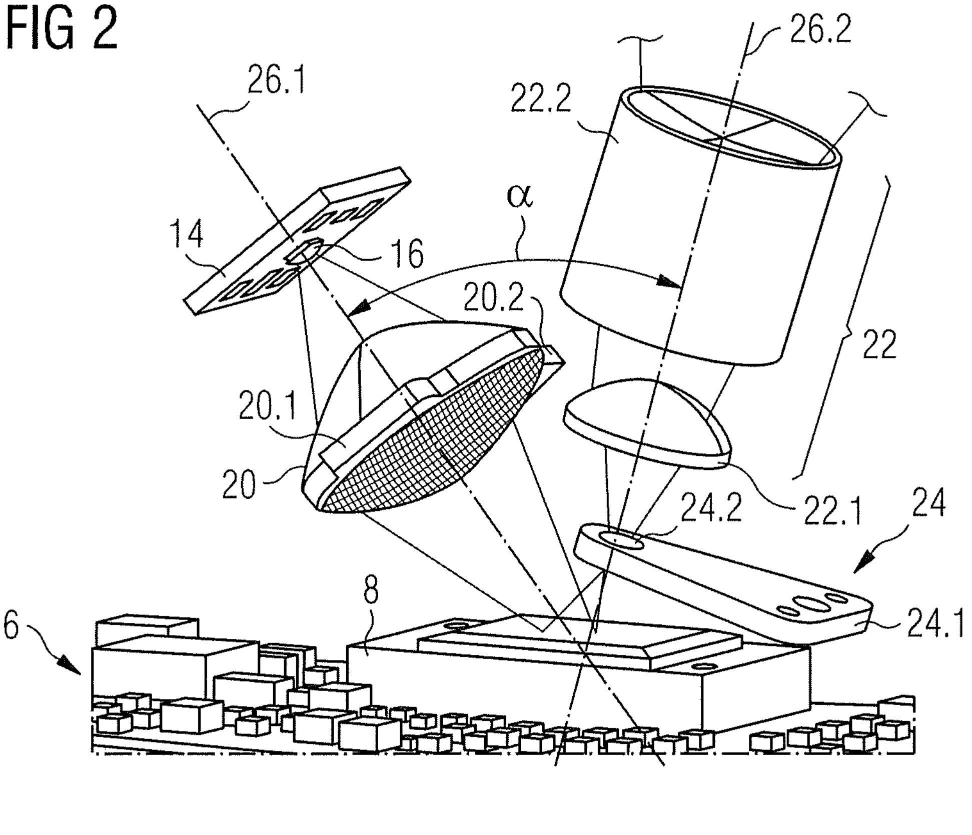
FIG. 2 is a perspective representation of the optical components of the light device of FIG. 1.

FIG. 2 illustrates the optical components of the light device 2 of FIG. 1. It can be seen that these comprise a diaphragm 24 formed by a tongue 24.1 provided with an orifice 24.2. The latter is disposed between the electromechanical microsystem 8 and the optical projection device 22. The role of the diaphragm is to cut the light rays which propagate too far from the nominal position in order to ensure a good definition, that is to say a good sharpness, of the image created by the system. The optical projection device 22 comprises a first lens 22.1 of the convergent type and a second lens 22.2 of the divergent type. The second lens has a significant thickness to the point of exhibiting a generally cylindrical form. The forming lens 20 for forming a beam from the light emitted by the light source 16 is a convergent biconvex lens, configured to form a convergent beam toward the optical microsystem and illuminating the optical surface of said system. It can be seen that the light source 16, the forming lens 20 and microsystem 8 are aligned according to a first optical axis 26.1 and that said microsystem 8, the diaphragm 24 and the optical projection device 22 are aligned according to a second optical axis 26.2. The angle $\alpha$ formed by these two optical axes advantageously lies between 40° and 70°, preferentially between 50° and 70°, or between 40° and 65°, or between 45° and 60°.

FIGS. 3 and 4 illustrate the light device of FIG. 1, without the board and the electromechanical microsystem, seen from the bottom face of the support.

In FIG. 3, it can be seen that the support 4 comprises, in addition, an element 28, partially sealing the cavity 30, within the body 10. This element 28 is formed by a plate 28.1 provided, at a peripheral portion, with means for fixing to the body 10, such as, in particular, orifices intended to receive fixing screws. The plate 28.1 is also provided, in a central portion, with an aperture 28.2. The latter is intended to allow the light originating from the forming lens 20 to enter the optical part of the electromechanical microsystem disposed facing the aperture 28.2 concerned. The element 28 can, to this end, comprise blocks 28.3 forming bearing surfaces for the electromechanical microsystem. These blocks 28.3, advantageously three of them in order to be isostatic, form surfaces that can be likened to spot surfaces. The electromechanical microsystem fixed to the printed circuit board can then be fixed to the support in such a way that the electromechanical microsystem is pressing on the blocks 28.3, thus ensuring a contact, and thereby, an exact positioning in the direction at right angles to the face 10.3 of the body 10. Means for positioning the board, on the plane of said board can be provided, such as in particular rods passing through orifices in the board and in the body 10 at the face 10.3 level.

Still in FIG. 3 and FIG. 4 the diaphragm 24 can be seen in the cavity 30 together with its fixing mode. The tongue 24.1 forming the diaphragm comprises, at its end opposite the orifice 24.2, two orifices 24.3 cooperating with positioning rods embedded in the body. It also comprises a fixing orifice 24.4 that is central in relation to the positioning orifices 24.3, said orifice receiving a fixing screw engaging with the body 10. To this end, the body 10 comprises, in the cavity 30, a void forming a bearing surface for the tongue 24.1, allowing the latter to pass under the element 28 (from the point of view of FIG. 3). It is interesting to note that the orifice 24.2 is situated at the end of the tongue 24.1 which is situated on the side of the forming lens 20, so as to avoid any obstruction of the light beam propagating from the forming lens 20 toward the electromechanical microsystem. The proximity between this beam and the edge of the tongue 24.1 at the level of the orifice 24.2 can be seen in FIG. 2.

FIG. 4 corresponds to FIG. 3, but in which the element 28 is absent. It can be seen therein that the first lens 22.1 of the optical projection device 22 is held in place on the body 10 by means of a first flange 32. The latter can have an open profile, in this case U-shaped, with the opening directed towards the forming lens 20. The forming lens 20 and the first lens 22.1 are in fact very close to one another to the point that no space is available for a portion of flange between the two lenses. The first flange 32 is advantageously fixed to the body 10 by screws engaging in threaded holes formed in said body.

FIG. 5 is a cross-sectional view of the light device of FIG. 1, the cross section being according to a median longitudinal plane, that is to say according to a plane generally parallel to the plane of FIG. 1 and passing through the center of the device. The device in cross section in FIG. 5 is represented without the printed circuit board and without the electromechanical microsystem.

The two optical axes 26.1 and 26.2, and the mounting of the lenses, can be seen therein. In effect, the forming lens 20 comprises two fixing lugs 20.1 and 20.2 (FIG. 2), these two lugs being advantageously diametrically opposite. They are housed in cavities formed in the body 10, so as to ensure an angular orientation of the forming lens 20, the latter being able to be not symmetrical in revolution. A second flange 34, in this case circular and closed, is disposed on the peripheral edge of the forming lens 20, including the lugs, and is fixed to the body by means of screws.

Similarly, the second lens 22.2 of the optical projection device is held in place by a third flange 36, also disposed on the peripheral edge of the second lens 22.2 and is fixed to the body by means of screws.

The lens forming 20 and the second lens 22.2 are put in place from the outside of the body by insertion into the respective reception zones. The lens first 22.1 is, for its part, put in place via the cavity 30.

The invention claimed is:

1. Support for a light module, notably for a motor vehicle, comprising:
- a reception zone for at least one light source;
- a reception zone for an optical forming device for forming the light emitted by the light source or sources;
- a reception zone for an electromechanical microsystem with at least one mirror capable of receiving the rays originating from the optical forming device; and
- a reception zone for at least one optical projection device receiving the rays reflected by the mirror or mirrors of the electromechanical microsystem;
- wherein
- the support forms a cavity with an aperture and comprises an outer surface around said aperture, said outer surface and said aperture forming the reception zone for the electromechanical microsystem.

2. Support according to claim 1, wherein the support comprises a body made of a single piece, said body forming the reception zones for the light source or sources, for the optical forming device and for the optical projection device.

3. Support according to claim 2, wherein the support comprises a plate that can be fixed to the body in order to partially seal the cavity and comprising the reception zone for the electromechanical microsystem.

4. Support according to claim 2, wherein the cavity is covered with an antireflection and/or absorbent coating, preferentially black.

5. Support according to claim 2, wherein the cavity is delimited by the reception zone for the optical forming device and the reception zone for the optical projection device.

6. Support according to claim 2, wherein at least one of the reception zones for the optical forming device and the optical projection device comprises an orifice formed in the support and a shoulder around said orifice.

7. Support according to claim 6, wherein each of the reception zones for the optical forming device and the optical projection device comprises an orifice formed in the support and a shoulder around said orifice.

8. Support according to claim 6, wherein the aperture is configured to allow passage of the rays originating from the optical forming device to the electromechanical microsystem.

9. Support according to claim 2, comprising within the cavity, a tongue overhanging and with an orifice intended to be passed through by the light reflected by the electromechanical microsystem toward the optical projection device.

10. Light device, notably for a motor vehicle, comprising:
- a support;
- at least one light source disposed on the support:
- an optical device for forming the light emitted by the light source or sources, said device being disposed on the support;
- an electromechanical microsystem with at least one mirror capable of receiving the rays originating from the optical forming device, said microsystem being disposed on the support; and
- an optical projection device capable of receiving the light reflected by the mirror or mirrors of the electromechanical microsystem, said device being disposed on the support wherein the support conforms to claim 2.

11. Support according to claim 2, wherein the body is made of aluminum.

12. Support according to claim 1, wherein the cavity is covered with an antireflection and/or absorbent coating, preferentially black.

13. Support according to claim 1, wherein the cavity is delimited by the reception zone for the optical forming device and the reception zone for the optical projection device.

14. Support according to claim 1, wherein at least one of the reception zones for the optical forming device and the optical projection device comprises an orifice formed in the support and a shoulder around said orifice.

15. Support according to claim 1, comprising, within the cavity, a tongue overhanging and with an orifice intended to be passed through by the light reflected by the electromechanical microsystem toward the optical projection device.

16. Light device, notably for a motor vehicle, comprising:
- a support;
- at least one light source disposed on the support:
- an optical forming device for forming the light emitted by the light source or sources, said device being disposed on the support;
- an electromechanical microsystem with at least one mirror capable of receiving the rays originating from the optical forming device, said microsystem being disposed on the support; and
- an optical projection device capable of receiving the light reflected by the mirror or mirrors of the electromechanical microsystem, said device being disposed on the support;
- wherein the support conforms to claim 1.

17. Device according to claim 16, wherein the light source or sources, the optical forming device and the microsystem form a first optical axis, and said microsystem and the optical projection device form a second optical axis, the angle between said optical axes lying between 40° and 65°.

18. Device according to claim 17, wherein the angle between said optical axes lies between 45° and 60°.

19. Device according to claim 16, wherein the light source or sources are of the light-emitting diode type on a board disposed on a heat sink fixed to the reception zone for said light source or sources.

20. Device according claim 16, wherein the optical forming device comprises a forming lens which is biconvex and/or the projection device comprises a first lens which is biconvex and a second lens which is biconcave.

21. Device according to claim 20, wherein at least one of the lenses of the optical forming device or the optical projection device is held in place by a flange.

22. Device according to claim 16, wherein the optical forming device has a diameter greater than two times that of the optical projection device.

23. Device according to claim 22, wherein the optical forming device has a diameter greater than three times that of the optical projection device.

24. Device according to claim 16, wherein the electromechanical microsystem is on a printed circuit board, said board being fixed to the support so as to press said microsystem against the reception zone for said microsystem.

25. Device according to claim 16, wherein the device is a rear signaling light capable of forming pictograms in the light beam produced, said pictograms being a function of a programming of the microsystem.

26. Support according to claim 1, wherein each of the reception zones for the optical forming device and the optical projection device comprises an orifice formed in the support and a shoulder around said orifice.

* * * * *